United States Patent [19]
Enns

[11] Patent Number: 4,526,265
[45] Date of Patent: Jul. 2, 1985

[54] LARGE CONVEYOR ASSEMBLIES FOR DETACHABLE MOUNTING TO A TRACTOR

[76] Inventor: Silvanus T. Enns, 14-224 Kennedy St., Winnipeg, Manitoba, Canada, R3C 1T1

[21] Appl. No.: 477,163

[22] Filed: Mar. 21, 1983

[30] Foreign Application Priority Data

Apr. 16, 1982 [CA] Canada .................................. 401159

[51] Int. Cl.³ .............................................. B65G 41/00
[52] U.S. Cl. .................................................. 198/318
[58] Field of Search ............... 198/318, 319, 320, 674, 198/302, 300, 312, 315, 316, 317; 414/523; 56/16.6

[56] References Cited

U.S. PATENT DOCUMENTS

| | | | |
|---|---|---|---|
| 1,853,253 | 4/1932 | Bennett | 198/320 |
| 2,410,012 | 10/1946 | Churchman | 198/302 |
| 2,682,945 | 7/1954 | Harper et al. | 198/318 |
| 2,792,103 | 5/1957 | Piemont | 198/320 |
| 2,813,618 | 11/1957 | Liston | 198/318 |
| 2,875,888 | 3/1959 | Swain et al. | 198/318 |
| 3,140,768 | 7/1964 | Marr | 198/318 |
| 3,297,148 | 1/1967 | Andrews | 198/319 |
| 3,533,500 | 10/1970 | Mayrath | 198/674 |
| 4,019,644 | 4/1977 | Seymour | 198/318 |
| 4,142,621 | 3/1979 | Oliver | 198/318 |
| 4,265,428 | 5/1981 | Formhals | 198/302 |

FOREIGN PATENT DOCUMENTS 1146107 5/1983 Canada .................................. 198/300

Primary Examiner—Joseph E. Valenza
Assistant Examiner—Kyle E. Shane
Attorney, Agent, or Firm—Stanley G. Ade

[57] ABSTRACT

Present conveyors such as portable grain augers are most commonly positioned, raised and lowered manually and may be powered by a small air-cooled engine or the power take-off of a farm tractor. The disclosed undercarriage assembly for such conveyors utilizes a tractor for all modes of transport, positioning, raising and lowering, and powering of the conveyor. This undercarriage configuration allows a tractor to be coupled beside and in parallel with the conveyor. The undercarriage moves as a unit with the tractor but is freestanding when uncoupled. The tractor power take-off is utilized to drive the conveyor through the use of an additional right angle gear box mounted on the undercarriage. The tractor hydraulic and electrical systems may be utilized to power winch and cylinder controls which act to raise and lower the conveyor.

24 Claims, 6 Drawing Figures

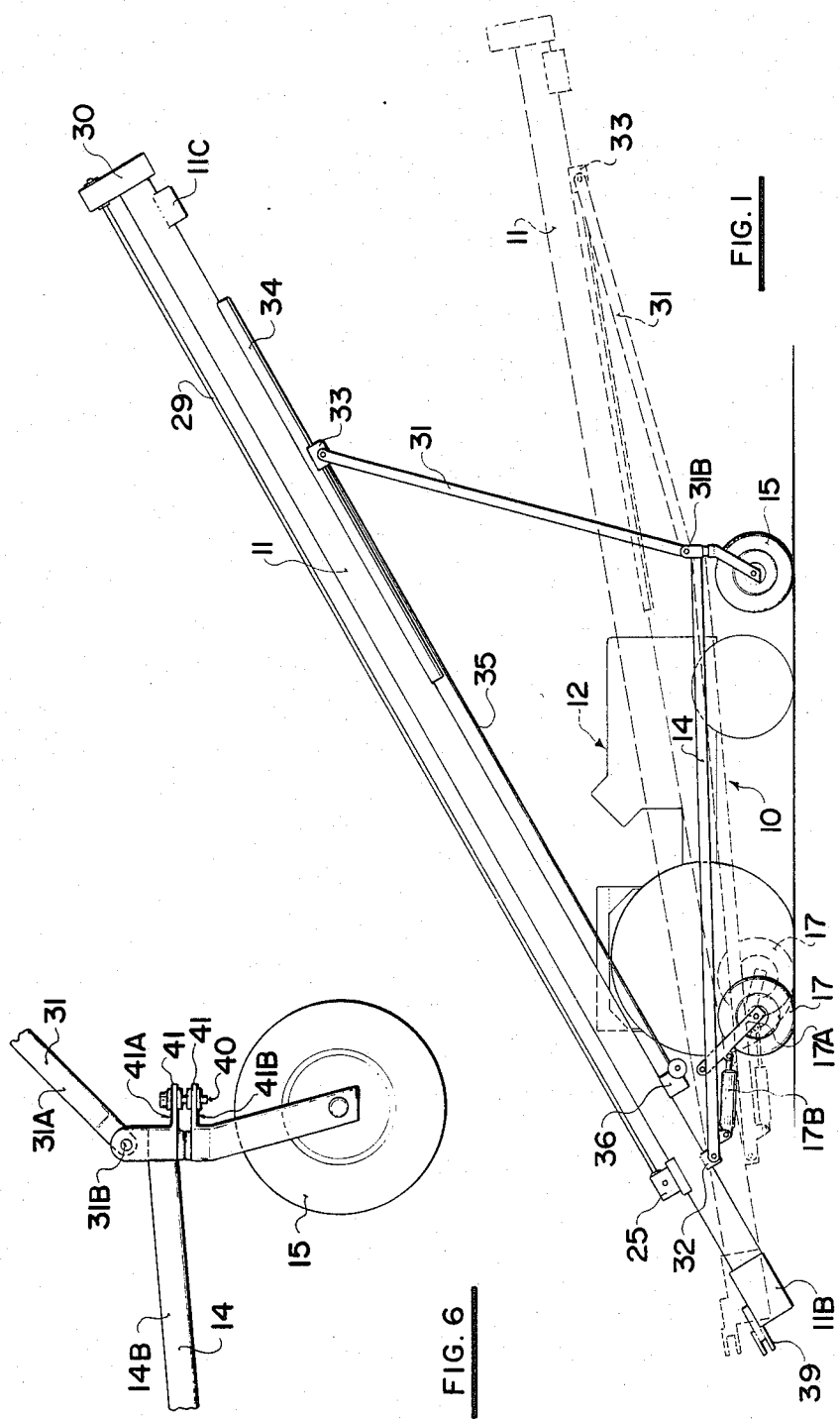

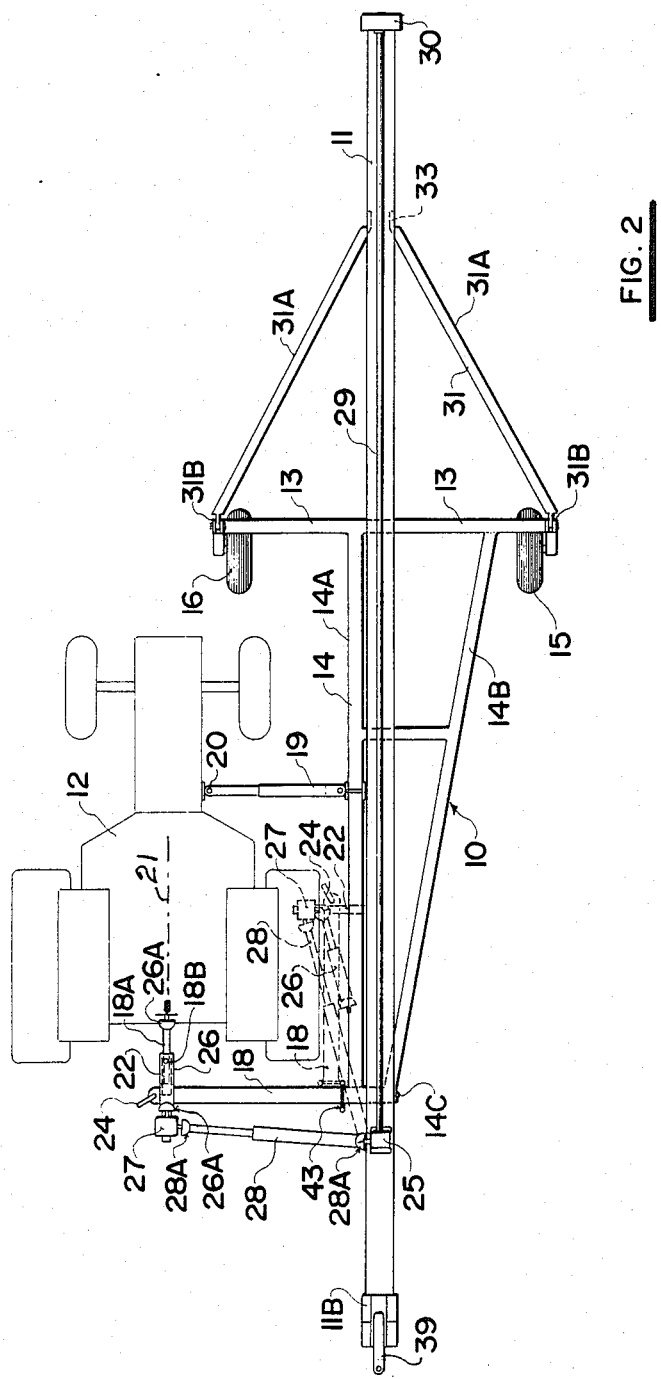

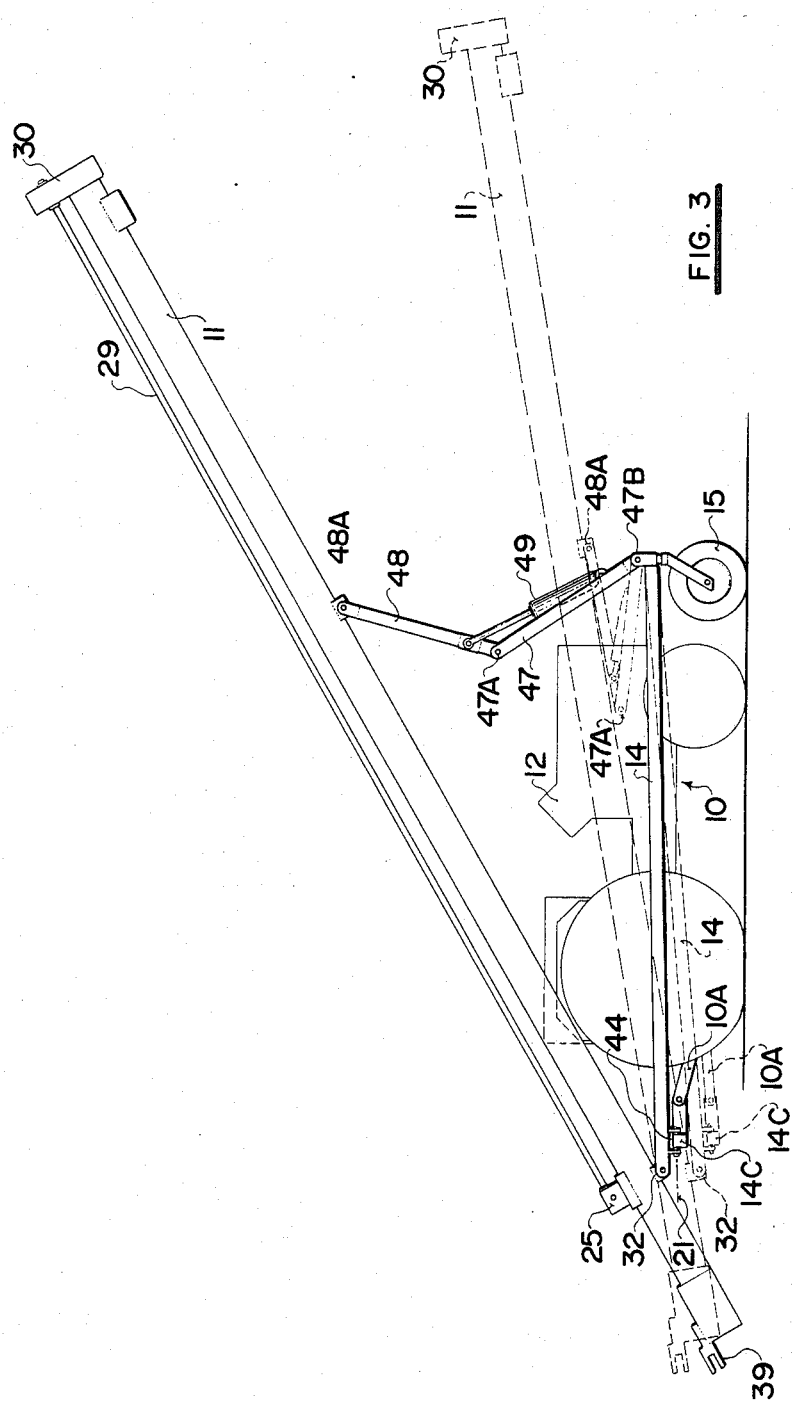

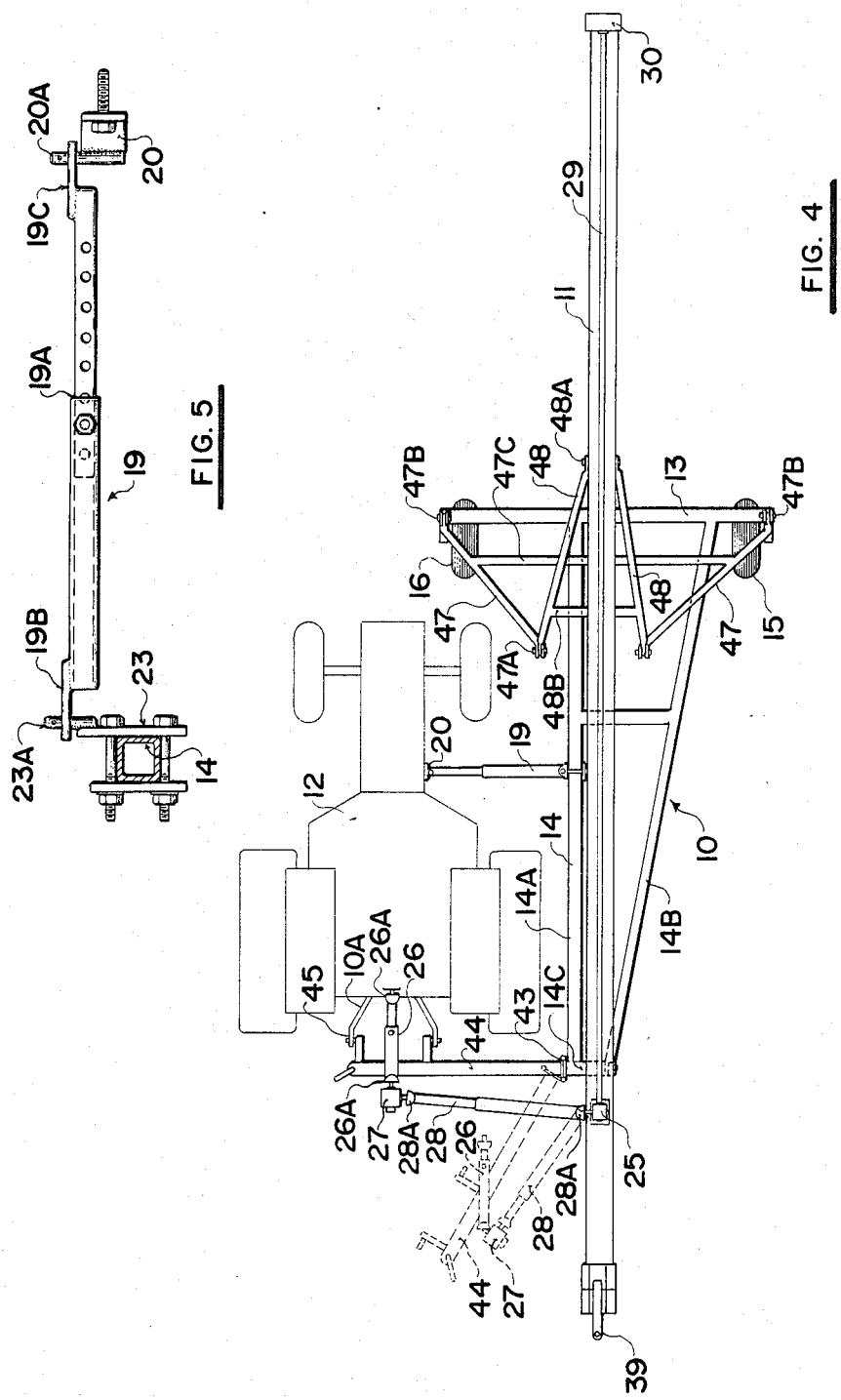

LARGE CONVEYOR ASSEMBLIES FOR DETACHABLE MOUNTING TO A TRACTOR

BACKGROUND OF THE INVENTION

This invention relates to new and useful improvements for portable grain auger assemblies, particularly relatively long and heavy assemblies which often utilize the tractor power take-off as a source of power.

Conventionally, portable grain auger assemblies utilize a two wheel undercarriage to support the auger tube. Positioning of the auger tube for loading a bin or truck is done manually. The auger tube is also most frequently raised and lowered manually with the use of a hand crank winch. Transport of these units over distances beyond the farm yard is accomplished by towing the unit behind a tractor or truck.

The heavy portable auger assemblies being used today in farming operations are very difficult to maneuver manually for positioning and are also awkward to position using any type of vehicle coupled to it in a towing position. In addition, raising and lowering these large units manually is extremely strenuous and time consuming.

SUMMARY OF THE INVENTION

The present invention is designed to overcome the difficulties encountered in transporting and positioning relatively long grain augers commonly used in filling large grain bins. The undercarriage fits under the auger tube and couples beside a farm tractor, which can then aid in movement for transport and positioning and act as a power source for raising and lowering the auger tube as well as turning the auger flighting.

In accordance with the invention there is provided an undercarriage assembly for relatively large conveyors such as portable grain augers and the like, for mounting to a tractor having a power take-off, a tractor hitch bar and/or a three-point hitch assembly; said undercarriage assembly comprising in combination a freestanding undercarriage including a frame, a pair of spaced apart front, ground engaging castor wheel assemblies mounted in said frame, means to support the rear of said frame, means for detachably and adjustably securing the undercarriage to the associated tractor, in side by side relationship, means for mounting a conveyor on said undercarriage for movement from a transport position to a working position and vice-versa, said last mentioned means also adjusting the working height of the intake and outlet ends of the conveyor, and means operatively connecting the conveyor to the power take-off of the tractor.

This undercarriage couples to the side of the tractor through the use of the tractor rear hitch lug or three-point hitch and a brace to the side or front of the tractor frame. The frame configuration utilizes two front castor wheels separated by a fairly large tread width and placed ahead and to the side of the tractor. The rear of the undercarriage frame, to which the inlet end of the auger tube is attached, is supported by a single wheel or alternatively, by a rigid hitch frame member coupled to the tractor three-point hitch system.

The lift system for the auger tube consists of linkages which allow both the intake height and outlet heights of the auger to be controlled. The inlet height of the auger tube is controlled by either the vertical positioning of the rear undercarriage wheel relative to the undercarriage frame or by adjusting the height of the tractor three-point hitch. When a rear lift wheel is used, a hydraulic cylinder is utilized to control a pivot arm connecting the wheel to the rear of the undercarriage frame.

In one embodiment, the front lift linkage includes a set of members connected between the undercarriage frame and a track running underneath the auger tube. A cable system controls the positioning of the top of this linkage along the track.

An alternative front lift linkage system may utilize a scissor-type linkage connected between the undercarriage frame and a fixed auger tube position. This scissor-type linkage is controlled through the use of an additional hydraulic cylinder.

The drive system between the tractor power take-off and the auger tube gear box preferably consists of a telescopic drive shaft connected to an additional right angle gear box mounted behind the tractor with the power output from this gear box going through a second telescopic drive shaft to the auger tube gear box.

It is recognized that this type of undercarriage is also potentially useful for other types of conveyors such as those used for handling hay bales or industrial materials. In such cases a chain or belt conveyor would replace the auger tube with the screw flighting.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a side elevation of one embodiment of the auger and undercarriage assembly coupled to the tractor.

FIG. 2 is a top plan view of FIG. 1 showing the auger flighting drive train and hitching members which couple the unit to the tractor.

FIG. 3 is a side elevation of an alternative embodiment of the auger and undercarriage assembly coupled to the tractor utilizing a different auger lift system than that of FIG. 1.

FIG. 4 is a top plan view of FIG. 3.

FIG. 5 is a side elevation of the side brace per se used to couple the undercarriage to the tractor side frame.

FIG. 6 is a fragmentary side elevation of the castor wheel locking device used when towing the auger unit behind another vehicle.

In the drawings like characters of reference indicate corresponding parts in the different figures.

DETAILED DESCRIPTION

FIGS. 1 and 2 illustrate views of the undercarriage assembly collectively designated 10 attached to the auger tube or casing 11 forming part of the auger assembly, and coupled to the tractor 12. A lowered tube position used for transport is shown in phantom. The frame 14 is supported by two front castor wheels 15 and 16, and a single rear wheel 17. The two castor wheels are mounted upon a front axle 13 or transverse frame member and are separated by a fairly large tread width for stability and are placed ahead of the tractor. This configuration requires that the auger tube has adequate reach beyond the front castor wheels but provides the stability necessary for very long auger units. The frame 14 includes a longitudinally extending member 14A extending rearwardly from the axle or transverse frame member 13 and a diagonal member 14B which converges rearwardly from adjacent the outer end of axle 13 to a relatively short transverse member 14C.

The undercarriage 10 is attached to the tractor through a rear hinged hitch frame member 18 and a front, side brace member 19. These two hitch members cause the undercarriage to maintain a constant position relative to the tractor.

The rear hitch frame member 18 is pivotally secured to tractor draw bar 18A by means of pin 18B and pivots about a longitudinal axis 21 at the back of the undercarriage frame 14 (see FIG. 2). It is provided with a hitch lug 22 at the distal end, extending at right angles therefrom, which also pivots about a longitudinal axis. This allows the rear hitch member to remain functional as its angle changes when adjustments to the inlet height of the auger tube are made. The member 18 is connected to the rear end of frame member 14A by two pins 43.

The side brace member 19 to the tractor is adjustable in position laterally and longitudinally. It consists of a bracket 23 with a vertical pin 23A clamped to the undercarriage frame for adjustable positioning therealong, a lengthwise adjustable telescopic member 19A with lugs 19B and 19C on each end respectively, for the pin connections and a bracket or lug 20 with a vertical pin 20A bolted onto the tractor frame. This arrangement is illustrated in detail in FIG. 6.

Referring again to FIGS. 1 and 2, the tractor is coupled to the undercarriage 14 by backing into position first and pinning the rear hitch 22 to the tractor drawbar by pin 18B. Then the side brace member 19 is positioned and pinned to the tractor frame lug 20 by pin 20A. If the tractor is not initially lined up parallel with the undercarriage it may be moved after the rear hitch is coupled until the tractor and undercarriage align themselves. The power take-off and all hydraulic and electrical connections are then made following this.

Uncoupling the tractor follows the reverse procedure. A jack stand 24 can be used to hold up the rear hitch during tractor hook-up or uncoupling.

The embodiment illustrated in FIGS. 1 and 2 utilizes a direct shaft drive system to power the auger flighting 11A from the tractor power take-off. The auger tube gear box 25 is placed relatively close to the auger inlet 11B so that variations in the height of the auger gear box input shaft do not become excessive as the angle of inclination of the auger assembly is varied. Furthermore, the placement of the drive system relatively close to the inlet allows the tractor to also be positioned further back thus allowing additional length clearance to the front castor wheels or additional auger reach.

The drive train to the auger tube gear box 25 consists of a telescopic drive shaft 26 with the universal joints 26A running from the tractor power take-off to the undercarriage gear box 27, the undercarriage gear box and a second telescopic drive shaft 28 with U-joints 28 running from the undercarriage gear box output to the auger tube gear box 25. The rest of the drive system to the flighting is a conventional system with a drive shaft 29 to either the top or bottom of the auger tube and a chain or gear drive 30 connecting it to the auger flighting in a conventional manner.

The auger tube 11 is supported above the undercarriage 14 by a set of lift linkages 31 at the front and a pivot axis 32 at the rear. The front linkage includes a pair of members 31A pivotally connected by the lower ends thereof as at 31B, to adjacent each end of transverse axle or member 13 and converging upwardly to support a slider or roller 33 which allows movement along a track 34 secured underneath the auger tube. A cable 35 may then be used to control the position of this slider or roller along the track. The take-up of the cable may be controlled by a winch 36 operated manually, electrically or hydraulically, mounted on the underside of the auger tube, undercarriage frame or lift linkages depending upon design parameters.

The rear height of the undercarriage and hence the height of the inlet 11B of the auger assembly, is controlled by the height of the rear lift wheel 17. This wheel is mounted on an arm 17A pivoting by one end thereof, from the rear of the undercarriage frame and by the other end thereof, from the rear lift wheel 17, with the arm position being controlled by a hydraulic piston and cylinder 17B. This piston and cylinder 17B may be single acting but is preferably double acting so that this wheel may be raised off the ground hydraulically for towing transport.

The embodiment illustrated in FIGS. 1 and 2 may be towed in a conventional manner, when uncoupled from the tractor, by using a tow hitch 39 attached to the intake end of the auger. The castor wheels 15 and 16 are allowed to rotate backwards 180° to where they can be locked in position, as shown in FIG. 6, with the use of a locking pin 40 through two pin lugs 41, one 41A on the frame 14 and the other, 41B on the castor wheel assembly. The rear hitch frame in FIG. 2 is swung forward to a position shown in phantom, by removing one of the pins 43 (the rearmost one) and allowing this connection to act as a hinge pivoting on the front pin. It is then secured to and held up by the main undercarriage frame. During towing transport the rear wheel 17 is held up off the ground by the rear hydraulic lift cylinder.

FIGS. 3 and 4 show an alternative embodiment of the undercarriage illustrated in FIGS. 1 and 2. The lowered auger tube position is again shown in phantom. This unit is functionally the same except that the tractor three-point hitch 10A is used to lift the intake end 11B of the auger, thus replacing the rear lift wheel. The rear frame support 44 is rigidly fastened to the two bottom three-point hitch links 45 and pivots at its attachment point to the rear of the undercarriage frame, being connected by the two pins 43. The undercarriage gear box 27 is mounted on this member and moves up and down as the three-point hitch is raised and lowered.

For hook-up, the rear frame support may be swung backward to the position shown in phantom, after the front pin 43 has been removed to allow this connection to act as a hinge. This allows the tractor to be backed in perpendicular to this member for easier hook-up of the three-point hitch. The tractor is then pulled ahead until the auger tube and tractor align themselves and the pin can be reinserted. By removing the pin at 43 on the other side of the connection, this same member can be swung forward for towing transport, as hereinbefore described.

FIGS. 3 and 4 also illustrate an alternative front lift linkage to that using a track system. This system uses a scissor-type front lift linkage controlled by a hydraulic cylinder. The scissors linkage consists of a pair of lower front lift linkage arms 47, a pair of upper front lift linkage arms 48 and a single acting front lift cylinder 49, positioned between the upper and lower lift linkage arms. The upper linkage arms 48 are pivoted by the upper ends thereof, one to each side of the auger tube as at 48A and diverge outwardly to be pivotally connected each by the other end thereof to the upper end of the corresponding lower arms 47 as at 47A. The lower arms diverge outwardly and are pivotally connected by the lower ends thereof, one to each end of the front axle or frame member 13, as at 47B. A cross member 48B spans the upper arms and a further cross member 47C spans the lower arms and the piston and cylinder assembly 49 is operatively connected therebetween.

This system does not require an auger tube track since it acts on a fixed auger tube pivot position. The front lift system shown in FIGS. 3 and 4 and that shown in FIGS. 1 and 2 are interchangeable and not dependent on the type of rear lift system.

The drive system and towing system for the unit in FIGS. 3 and 4 is the same as that described for FIGS. 1 and 2.

For handling other commodities such as hay bales or industrial materials, a conventional belt or chain type conveyor may be used to replace the auger tube with its screw flighting. Such a conveyor would be mounted on the rear frame pivot and top front lift linkage pivot in the same way as the auger tube.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A transportable auger for mounting to a tractor including a hitch and a PTO at a rear position thereon; said auger including in combination a freestanding undercarriage including a frame, a pair of spaced apart front, ground engaging castor wheel assemblies mounted in said frame, a ground wheel directionally fixed to said frame to support the rear of said frame, means for detachably and adjustably securing the undercarriage to the hitch of said tractor, means for interconnecting the frame to said tractor at a position forwardly of said hitch and rearwardly of said front wheels whereby the tractor and undercarriage when connected are in side by side relationship, an auger tube having an inlet end and a discharge end and means for mounting said auger tube on said undercarriage with said discharge end forward of said front wheels, means for raising and lowering said inlet end, means for raising said forward discharge end from a transport position to various working positions and vice-versa and a telescopic drive shaft for communicating drive from said PTO to said auger.

2. The assembly according to claim 1 in which said undercarriage includes a transversely extending front axle or frame member, one of said front castor wheel assemblies being operatively mounted upon each end of said axle or frame member, one of said castor wheel assemblies being on one side of said conveyor and in advance of said tractor, the other of said castor wheel assemblies being on the other side of said conveyor, level with said one castor wheel assembly and to one side of said tractor, when said assembly is secured to said tractor.

3. The assembly according to claim 1 in which said interconnecting means includes a front, transversely extending telescopic brace member secured by one end thereof to said frame for adjustment therealong and by the other end thereof to adjacent the front or side of the associated tractor.

4. The assembly according to claim 2 in which said interconnecting means includes a front, transversely extending telescopic brace member secured by one end thereof to said frame for adjustment therealong and by the other end thereof to adjacent the front or side of the associated tractor.

5. The assembly according to claim 1 in which said hitch means for detachably and adjustably mounting said undercarriage to said tractor includes a rear hitch bar pivotally secured by one end thereof to adjacent the rear of said frame and extending transversely therefrom to be detachably connected to said tractor and being selectively pivotal forwardly towards said frame for transport purposes when disconnected from said tractor.

6. The assembly according to claim 2 in which said hitch means for detachably and adjustably mounting said undercarriage to said tractor includes a rear hitch bar pivotally secured by one end thereof to adjacent the rear of said frame and extending transversely therefrom to be detachably connected to said tractor and being selectively pivotal forwardly towards said frame for transport purposes when disconnected from said tractor.

7. The assembly according to claim 3 in which said hitch means for detachably and adjustably mounting said undercarriage to said tractor includes a rear hitch bar pivotally secured by one end thereof to adjacent the rear of said frame and extending transversely therefrom to be detachably connected to said tractor and being selectively pivotal forwardly towards said frame for transport purposes when disconnected from said tractor.

8. The assembly according to claim 4 in which said hitch means for detachably and adjustably mounting said undercarriage to said tractor includes a rear hitch bar pivotally secured by one end thereof to adjacent the rear of said frame and extending transversely therefrom to be detachably connected to said tractor and being selectively pivotal forwardly towards said frame for transport purposes when disconnected from said tractor.

9. The assembly according to claim 1 in which said means for mounting said auger tube to said undercarriage includes front lift linkage operatively extending between the front end of said frame and said auger tube, said means for mounting said auger tube to said undercarriage also includes said rear ground wheel having an arm pivotally secured by one end thereof to said frame, a wheel journalled for rotation at the other end of said arm, and a hydraulic piston and cylinder assembly operatively extending between said arm and said frame for raising and lowering the rear end of said frame and hence the intake end of said auger assembly relative to the ground, said front lift linkage including a pair of front members pivotally secured by one end thereof, one to each side of said frame at the front ends thereof and coverging upwardly to a common apex, a roller assembly mounted at said apex, longitudinally extending track means on said auger assembly mounting said roller assembly for movement therealong, and means to move said roller assembly along said track means for raising and lowering the outlet end of said auger assembly.

10. The assembly according to claim 2 in which said means for mounting said auger tube to said undercarriage includes front lift linkage operatively extending between the front end of said frame and said auger tube, said means for mounting said auger tube to said undercarriage also includes said rear ground wheel having an arm pivotally secured by one end thereof to said frame, a wheel journalled for rotation at the other end of said arm, and a hydraulic piston and cylinder assembly operatively extending between said arm and said frame for raising and lowering the rear end of said frame and hence the intake end of said auger assembly relative to the ground, said front lift linkage including a pair of front members pivotally secured by one end thereof, one to each side of said frame at the front ends thereof and converging upwardly to a common apex, a roller assembly mounted at said apex, longitudinally extending track means on said auger assembly mounting said roller assembly for movement therealong, and means to move said roller assembly along said track means for raising and lowering the outlet end of said auger assembly.

11. The assembly according to claim 3 in which said means for mounting said auger tube to said undercarriage includes front lift linkage operatively extending between the front end of said frame and said auger tube, said means for mounting said auger tube to said undercarriage also includes said rear ground wheel having an arm pivotally secured by one end thereof to said frame, a wheel journalled for rotation at the other end of said arm, and a hydraulic piston and cylinder assembly operatively extending between said arm and said frame for raising and lowering the rear end of said frame and hence the intake end of said auger assembly relative to the ground, said front linkage including a pair of front members pivotally secured by one end thereof, one to each side of said frame at the front ends thereof and converging upwardly to a common apex, a roller assembly mounted at said apex, longitudinally extending track means on said auger assembly mounting said roller assembly for movement therealong, said means to move said roller assembly along said track means for raising and lowering the outlet end of said auger assembly.

12. The assembly according to claim 5 in which said means for mounting said auger tube to said undercarriage includes front lift linkage operatively extending between the front end of said frame and said auger tube, said means for mounting said auger tube to said undercarriage also includes said rear ground wheel having an arm pivotally secured by one end thereof to said frame, a wheel journalled for rotation at the other end of said arm, and a hydraulic piston and cylinder assembly operatively extending between said arm and said frame for raising and lowering the rear end of said frame and hence the intake end of said auger assembly relative to the ground, said front lift linkage including a pair of front members pivotally secured by one end thereof, one to each side of said frame at the front ends thereof and converging upwardly to a common apex, a roller assembly mounted at said apex, longitudinally extending track means on said auger assembly mounting said roller assembly for movement therealong, and means to move said roller assembly along said track means for raising and lowering the outlet end of said auger assembly.

13. The assembly according to claim 7 in which said means for mounting said auger tube to said undercarriage includes front lift linkage operatively extending between the front end of said frame and said auger tube, said means for mounting said auger tube to said undercarriage also includes said rear ground wheel having an arm pivotally secured by one end thereof to said frame, a wheel journalled for rotation at the other end of said arm, and a hydraulic piston and cylinder assembly operatively extending between said arm and said frame for raising and lowering the rear end of said frame and hence the intake end of said auger assembly relative to the ground, said front lift linkage including a pair of front members pivotally secured by one end thereof, one to each side of said frame at the front ends thereof and coverging upwardly to a common apex, a roller assembly mounted at said apex, longitudinally extending track means on said auger assembly mounting said roller assembly for movement therealong, and means to move said roller assembly along said track means for raising and lowering the outlet end of said auger assembly.

14. The assembly according to claim 5 in which said means for mounting said auger tube to said undercarriage includes front lift linkage operatively extending between the front end of said frame and said auger tube, said hitch means for detachably and adjustably mounting said undercarriage said tractor including a rear hitch bar pivotally secured by one end thereof and extending transversely from the rear of said frame and being detachably secured to a three-point hitch of the associated tractor, said hitch bar being selectively pivotable forwardly towards said frame for transport purposes when disconnected from said tractor and selectively pivotable rearwardly of said frame to facilitate the connection of said rear hitch bar to the three-point hitch of the tractor.

15. The assembly according to claim 7 in which said means for mounting said auger tube to said undercarriage includes front lift linkage operatively extending between the front end of said frame and said auger tube, said hitch means for detachably and adjustably mounting said undercarriage said tractor including a rear hitch bar pivotally secured by one end thereof and extending transversely from the rear of said frame and being detachably secured to a three-point hitch of the associated tractor, said hitch bar being selectively pivotable forwardly towards said frame for transport purposes when disconnected from said tractor and selectively pivotable rearwardly of said frame to facilitate the connection of said rear hitch bar to the three-point hitch of the tractor.

16. The assembly according to claim 1 in which said means for mounting said auger tube to said undercarriage includes front lift linkage operatively extending between the front end of said frame and said auger tube, said front lift linkage including a scissor-type linkage operatively extending between said frame and said auger assembly, and a hydraulic pistion and cylinder assembly operatively extending between said frame and said scissor-type linkage for raising and lowering said outlet end of said auger assembly.

17. The assembly according to claim 2 in which said means for mounting said auger tube to said undercarriage includes front lift linkage operatively extending between the front end of said frame and said auger tube, said front lift linkage including a scissor-type linkage operatively extending between said frame and said auger assembly, and a hydraulic pistion and cylinder assembly operatively extending between said frame and said scissor-type linkage for raising and lowering said outlet end of said auger assembly.

18. The assembly according to claim 5 in which said means for mounting said auger tube to said undercarriage includes front lift linkage operatively extending between the front end of said frame and said auger tube, said front lift linkage including a scissor-type linkage operatively extending between said frame and said auger assembly, and a hydraulic pistion and cylinder assembly operatively extending between said frame and said scissor-type linkage for raising and lowering said outlet end of said auger assembly.

19. The assembly according to claim 1 which includes a towing hitch at the intake end of said auger tube for attaching to a towing means for transportation purposes and means to detachably lock said front castor wheels in the forwardly in-line position parallel to the longitudinal axis of said undercarriage when attached to said towing means.

20. The assembly according to claim 3 which includes a towing hitch at the intake end of said auger tube for attaching to a towing means for transportation purposes and means to detachably lock said front castor wheels in the forwardly in-line position parallel to the longitudinal axis of said undercarriage when attached to said towing means.

21. The assembly according to claim 5 which includes a towing hitch at the intake end of said auger tube for attaching to a towing means for transportation purposes and means to detachably lock said front castor wheels in the forwardly in-line position parallel to the longitudinal axis of said undercarriage when attached to said towing means.

22. The assembly according to claim 7 which includes a towing hitch at the intake end of said auger tube for attaching to a towing means for transportation purposes and means to detachably lock said front castor wheels in the forwardly in-line position parallel to the longitudinal axis of said undercarriage when attached to said towing means.

23. The assembly according to claim 17 which includes a towing hitch at the intake end of said auger tube for attaching to a towing means for transportation purposes and means to detachably lock said front castor wheels in the forwardly in-line position parallel to the longitudinal axis of said undercarriage when attached to said towing means.

24. The assembly according to claim 18 which includes a towing hitch at the intake end of said auger tube for attaching to a towing means for transportation purposes and means to detachably lock said front castor wheels in the forwardly in-line position parallel to the longitudinal axis of said undercarriage when attached to said towing means.

* * * * *